(12) United States Patent
Mishima et al.

(10) Patent No.: US 9,110,296 B2
(45) Date of Patent: Aug. 18, 2015

(54) IMAGE PROCESSING DEVICE, AUTOSTEREOSCOPIC DISPLAY DEVICE, AND IMAGE PROCESSING METHOD FOR PARALLAX CORRECTION

(71) Applicants: Nao Mishima, Tokyo (JP); Takeshi Mita, Kanagawa (JP)

(72) Inventors: Nao Mishima, Tokyo (JP); Takeshi Mita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 296 days.

(21) Appl. No.: 13/666,194

(22) Filed: Nov. 1, 2012

(65) Prior Publication Data

US 2013/0258057 A1 Oct. 3, 2013

(30) Foreign Application Priority Data

Mar. 29, 2012 (JP) ................................ 2012-077612

(51) Int. Cl.
*H04N 13/02* (2006.01)
*G02B 27/22* (2006.01)
*H04N 13/04* (2006.01)

(52) U.S. Cl.
CPC ........ *G02B 27/2214* (2013.01); *H04N 13/0404* (2013.01); *H04N 13/0415* (2013.01); *H04N 13/0445* (2013.01)

(58) Field of Classification Search
CPC ........... G02B 27/2214; H04N 13/0404; H04N 13/0415; H04N 13/0445
USPC .......................................................... 348/46
See application file for complete search history.

(56) References Cited

U.S. PATENT DOCUMENTS

| 7,113,634 | B2 * | 9/2006 | Yano .............................. 382/154 |
| 2007/0268589 | A1 | 11/2007 | Ra et al. |
| 2012/0038632 | A1 * | 2/2012 | Matsunaga et al. ........... 345/419 |

(Continued)

FOREIGN PATENT DOCUMENTS

| CN | 102378024 A | 3/2012 |
| JP | 4253345 | 1/2009 |
| JP | 2009-192615 | 8/2009 |

(Continued)

OTHER PUBLICATIONS

Notification of the First Office Action issued by the State Intellectual Property Office of the People's Republic of China on Nov. 14, 2014, for Chinese Patent Application No. 201210385347.3, and English-language translation thereof.
Notice of Rejection issued by the Japanese Patent Office on May 27, 2014, for Japanese Patent Application No. 2012-077612, and English-language translation thereof.

(Continued)

*Primary Examiner* — Jessica M Prince
(74) *Attorney, Agent, or Firm* — Finnegan, Henderson, Farabow, Garrett & Dunner, L.L.P.

(57) ABSTRACT

According to an image processing device includes an acquiring unit and a correcting unit. The acquiring unit is configured to acquire a stereoscopic image containing a plurality of parallax images each having a mutually different parallax. The correcting unit is configured to perform, for each pixel of the stereoscopic image, correction to set a parallax number of a parallax image viewed at a viewpoint position to a first parallax number of a parallax image to be viewed at the viewpoint position by using correction data representing a difference value between the first parallax number and a second parallax number of a parallax image that is actually viewed at the viewpoint position and on which distortion correction for correcting distortion of light beams has been performed.

5 Claims, 10 Drawing Sheets

(56) References Cited

U.S. PATENT DOCUMENTS

2012/0113278 A1* 5/2012 Okada .................. 348/208.4
2013/0050419 A1* 2/2013 Nakamura et al. ............. 348/43

FOREIGN PATENT DOCUMENTS

| | | |
|---|---|---|
| JP | 2009-251098 | 10/2009 |
| JP | 2012-60625 | 3/2012 |

OTHER PUBLICATIONS

Mishima, N. et al., "Image Processing Device, Method and Computer Program Product, and Image Display Apparatus," U.S. Appl. No. 13/593,594, filed Aug. 24, 2012.

Office Action issued by the Taiwanese Patent Office on Mar. 10, 2015, for Taiwanese Patent Application No. 101141155, and English-language translation thereof.

* cited by examiner

IMAGE PROCESSING DEVICE, AUTOSTEREOSCOPIC DISPLAY DEVICE, AND IMAGE PROCESSING METHOD FOR PARALLAX CORRECTION

CROSS-REFERENCE TO RELATED APPLICATIONS

This application is based upon and claims the benefit of priority from Japanese Patent Application No. 2012-077612, filed on Mar. 29, 2012; the entire contents of which are incorporated herein by reference.

FIELD

Embodiments described herein relate generally to an image processing device, an autostereoscopic display device, an image processing method and a computer program product.

BACKGROUND

There are image display devices allowing viewers to view stereoscopic images. An image display device includes, on a front face of a display panel on which a plurality of pixels are arranged, a light beam controller that controls the emitting directions of light beams from the pixels, and displays a plurality of parallax images each having a mutually different parallax.

For example, in a case of a sheet display or the like where a display area itself can be bent or in a case where parts of a panel and a lens are deformed or removed because of aged deterioration, there will occur regions where a stereoscopic image can be viewed and regions (pseudoscopic regions) where a stereoscopic image cannot be viewed in the display area (screen), and viewers therefore cannot view a stereoscopic image on the whole screen.

DETAILED DESCRIPTION

According to an image processing device includes an acquiring unit and a correcting unit. The acquiring unit is configured to acquire a stereoscopic image containing a plurality of parallax images each having a mutually different parallax. The correcting unit is configured to perform, for each pixel of the stereoscopic image, correction to set a parallax number of a parallax image viewed at a viewpoint position to a first parallax number of a parallax image to be viewed at the viewpoint position by using correction data representing a difference value between the first parallax number and a second parallax number of a parallax image that is actually viewed at the viewpoint position and on which distortion correction for correcting distortion of light beams has been performed.

Various embodiments will be described below in detail with reference to the accompanying drawings. An autostereoscopic display device according to the embodiments described below allows a viewer to view the stereoscopic images by displaying a plurality of parallax images each having a mutually different parallax. The autostereoscopic display device may employ a 3D display method such as the integral imaging method (II method) or the multi-viewpoint method. Examples of the autostereoscopic display device include a TV set, a PC, a smart phone and a digital photo frame that enables the viewer to view stereoscopic images with naked eyes.

First Embodiment

Figure 1:
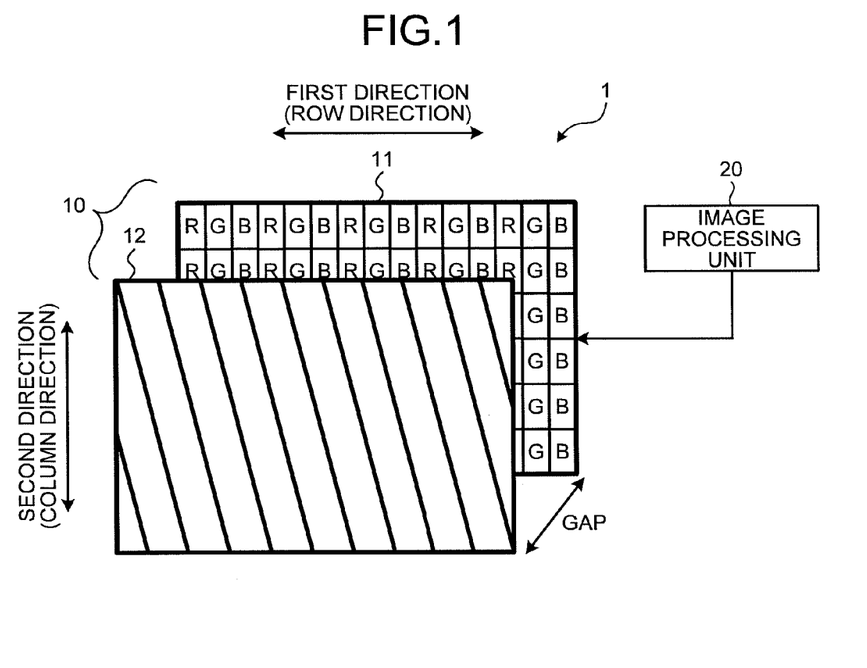
FIG. 1 is a diagram illustrating an example of an autostereoscopic display device according to a first embodiment.

FIG. 1 is a schematic view of an autostereoscopic display device 1 according to the first embodiment. The autostereoscopic display device 1 includes a display unit 10 and an image processing unit 20.

The display unit 10 is a device capable of displaying the stereoscopic images containing a plurality of parallax images each having a mutually different parallax. As illustrated in FIG. 1, the display unit 10 includes a display panel 11 and a light beam control element 12.

A parallax image is an image used to allow a viewer to view a stereoscopic image and refers to each of images constituting a stereoscopic image. A stereoscopic image is an image in which the pixels of the parallax images are assigned in such a way that, when the display panel 11 is viewed through the light beam control element 12 from a viewpoint position of a viewer, one of the parallax images is seen by one eye of the viewer and another parallax image is seen by the other eye of the viewer. Thus, a stereoscopic image is generated by rearranging the pixels of each parallax image.

The display panel 11 is a liquid crystal panel in which a plurality of sub-pixels having color components (such as R, G, and B) are arranged in a matrix in a first direction (row direction) and a second direction (column direction). Alternatively, the display panel 11 may also be a flat panel such as an organic EL panel or a plasma panel. The display panel 11 illustrated in FIG. 1 is assumed to include a light source such as a backlight. In the example of FIG. 1, one pixel is constituted by sub-pixels of R, G, and B. The sub-pixels are arranged such that a pattern in an order of R (red), G (green) and B (blue) is repeated in the first direction and the same color components are arranged in the second direction.

The light beam control element 12 controls the outgoing direction of light beam coming out from each sub-pixel on the display panel 11. The light beam control element 12 has a plurality of optical openings, each extending in a linear fashion and each allowing a light beam to go out therethrough, is arranged along the first direction. In the example of FIG. 1, the light beam control element 12 is lenticular sheet having a plurality of cylindrical lenses (serving as the optical openings) arranged thereon, but the light beam control element 12 is not limited thereto and may also be a parallax barrier having a plurality of slits arranged thereon, for example. Meanwhile, the display panel 11 and the light beam control element 12 have a certain distance (gap) maintained therebetween. In addition, the light beam control element 12 is arranged in such a way that the extending direction of the optical openings has a predetermined tilt with respect to the second direction (column direction) of the display panel 11, and the positions of the optical openings and display pixels in the row direction are therefore shifted, as a result of which the viewing zone (the area where a stereoscopic image can be viewed) therefore varies depending on the height.

Figure 2:
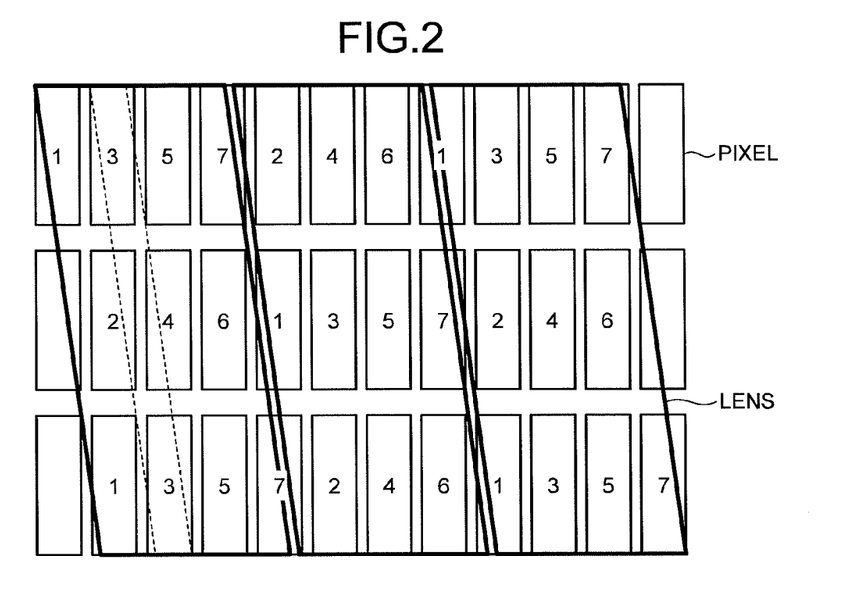
FIG. 2 is a diagram for explaining an example of pixel mapping.

In the first embodiment, since lenses are arranged obliquely on the pixels as illustrated in FIG. 2, pixels viewed through the lenses are those along dotted lines in FIG. 2, for example. Specifically, since the pixels within the display panel 11 are arranged in a matrix along the horizontal direction and the vertical direction while the lenses are arranged obliquely, the pixels need to be assigned along the extending direction of the lenses in assignment (pixel mapping) of pixels to display parallax images. A case of assignment of pixels each displaying one of seven parallax images will be described here as an example. Pixels having the same number are pixels displaying the same parallax image. Parallax images are assigned with numbers (parallax numbers) that are different from one another and different by 1 from those of adjacent parallax images in advance. A parallax number v of a pixel (i, j) on a i-th row and a j-th column on which pixel mapping is performed among a plurality of pixels arranged on the display panel 11 can be obtained by the following expression (1), for example.

$$v(i, j) = \frac{\mod((i + i_{offset} - 3j \cdot a\tan), X)}{X_n} N \quad (1)$$

Figure 3:
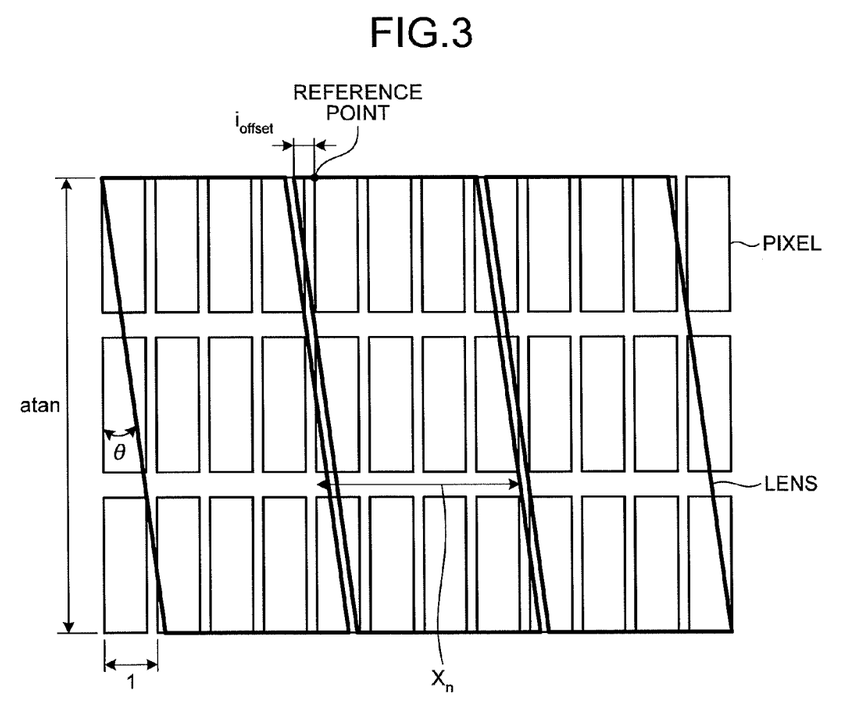
FIG. 3 is a diagram for explaining an example of pixel mapping.

In the expression (1), $i_{offset}$ represents a phase shift between an image and a lens and is represented in units of pixels. In the example of FIG. 3, an upper-left end of an image is a reference point (point of origin) and a shift amount between the reference point and an upper-left end of the lens is represented by $i_{offset}$.

The parallax numbers v are continuous values but parallax images are discrete, and therefore a parallax image itself cannot be assigned to v. Therefore, interpolation such as linear interpolation or cubic interpolation is used. In this manner, a plurality of parallax images each having a mutually different parallax is displayed on the display unit 10.

Figure 4:
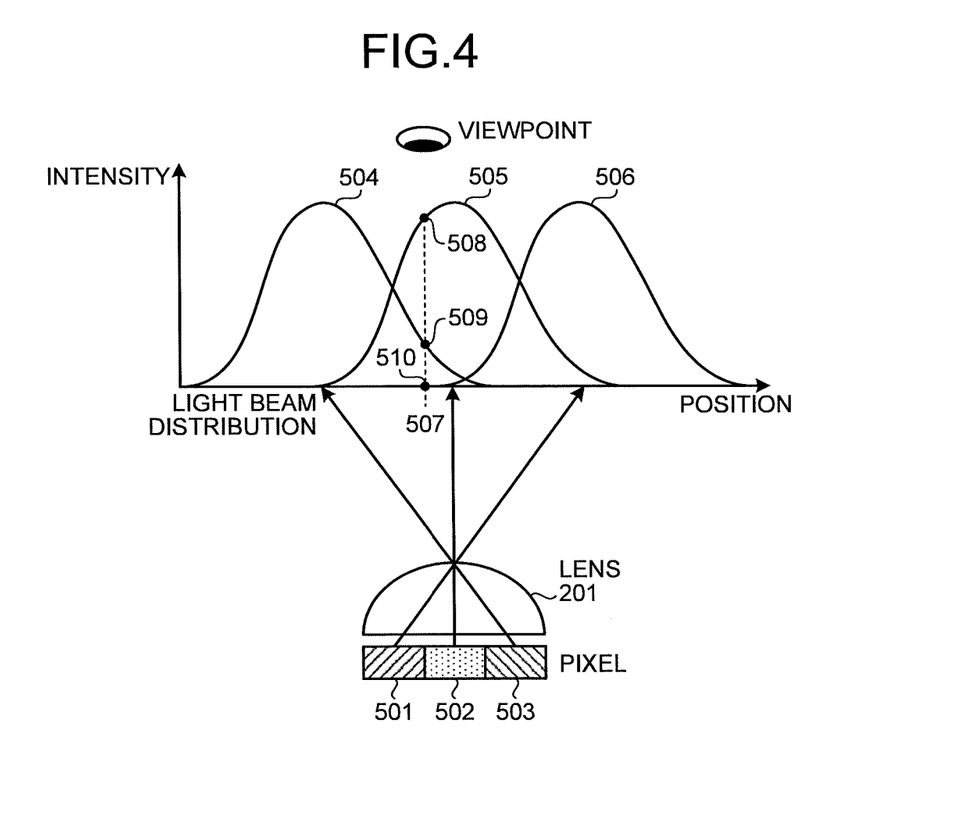
FIG. 4 is a diagram for explaining light reaching an eye at a certain viewpoint.

Next, light reaching an eye at a certain viewpoint will be described. FIG. 4 is a diagram schematically illustrating a light beam distribution in a case where the number of lenses 201 is one, the number of parallax images (the number of parallaxes) is three and the width and the height of each parallax image are both 1 (which can be regarded as a pixel in this case). A light beam coming out from one pixel enters the lens 201 and is ejected in a direction as controlled. Since light beams are diffused, the intensity of the light beams measured at positions at a certain distance from the lens 201 is distributed within a certain range as illustrated in FIG. 4. Note that the horizontal axis represents the position in the first direction, the vertical axis represents the intensity of light, the light beam distribution of a pixel 501 is denoted by 506, the light beam distribution of a pixel 502 is denoted by 505, and the light beam distribution of a pixel 503 is denoted by 504.

Light reaching an eye when the lens 201 is viewed from a certain viewpoint is light in which pixel values of the pixels are overlaid (colors are mixed) according to the light beam distributions (504, 505, and 506). For example, light reaching an eye when the lens 201 is viewed from a position 507 corresponding to a certain viewpoint is represented by pixel values of the pixels 501, 502 and 503 weighted with values 508, 509 and 510 at the position 507 of the light beam distributions as weights. Similarly, in a case of a plurality of lenses, a viewed image that can be viewed when an autostereoscopic display device of the II method is viewed with an eye from a viewpoint is an overlay image in which pixels of a plurality of parallax images are overlaid according to the intensities of the light beam distributions at the viewpoint. Parallax images are images in which the position of an object is shifted from one another so as to produce an effect of binocular disparity. Since the light beam distribution varies according to the viewpoint, the viewed image is an image varying according to the viewpoint. Although a case where the number of parallaxes is three is described in this example, the number of parallaxes may be designed to be any number. For example, the number of parallaxes may be nine. The description of an embodiment in such case will be similar to that in the case where the number of parallaxes is three.

Figure 5A:
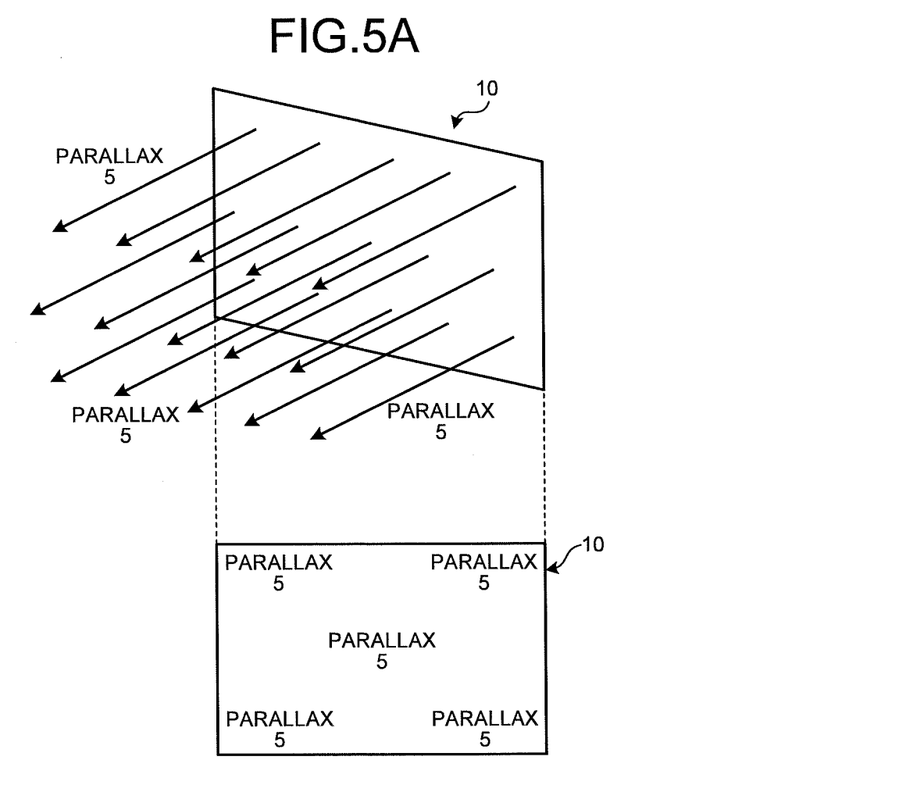
FIGS. 5A and 5B are schematic diagrams in a case where light beam directions are uniform.
Figure 5B:
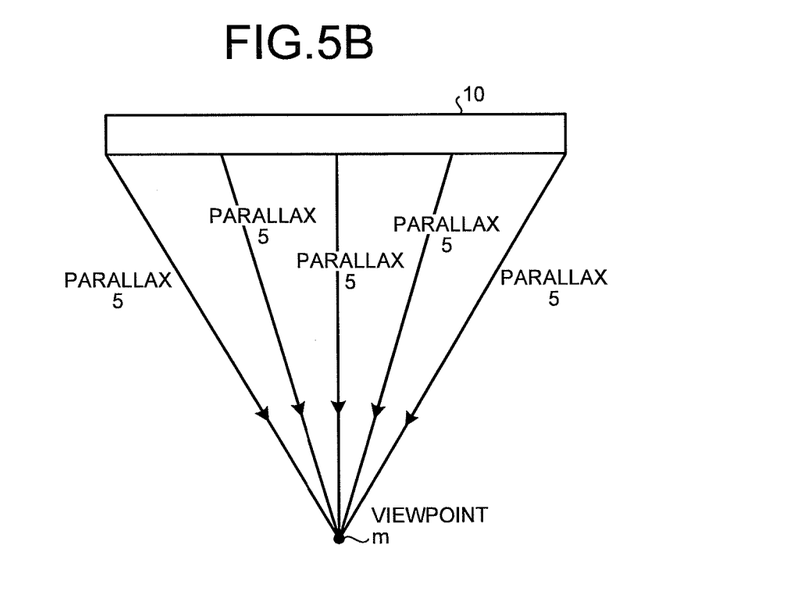

FIGS. 5A and 5B are diagrams illustrating a case where the directions of light beams coming out from pixels with the same parallax number are uniform when the number of parallaxes is nine. Uniform light beam directions mean that the directions of light beams coming out from pixels with the same parallax number correspond to a predetermined direction. More specifically, uniform light beam directions mean that pixels of parallax images identified by the same parallax number are viewed at a certain viewpoint position (one eye).

FIG. 5A is a diagram illustrating parallax numbers of parallax images viewed in a display area of a stereoscopic image on the display unit 10 from a certain viewpoint position in a case where the light beam directions are uniform. In this example, it is assumed that parallax images to be viewed from the viewpoint position m are those with the parallax number 5. In this case, since light coming out from the pixels of the parallax images with the parallax number 5 enters the viewpoint position m from the display unit 10 as illustrated in FIG. 5B, the viewer can view parallax images with the parallax number 5 over all the regions of the display unit 10 when the viewer views the display unit 10 from the viewpoint position m with one eye.

Figure 6A:
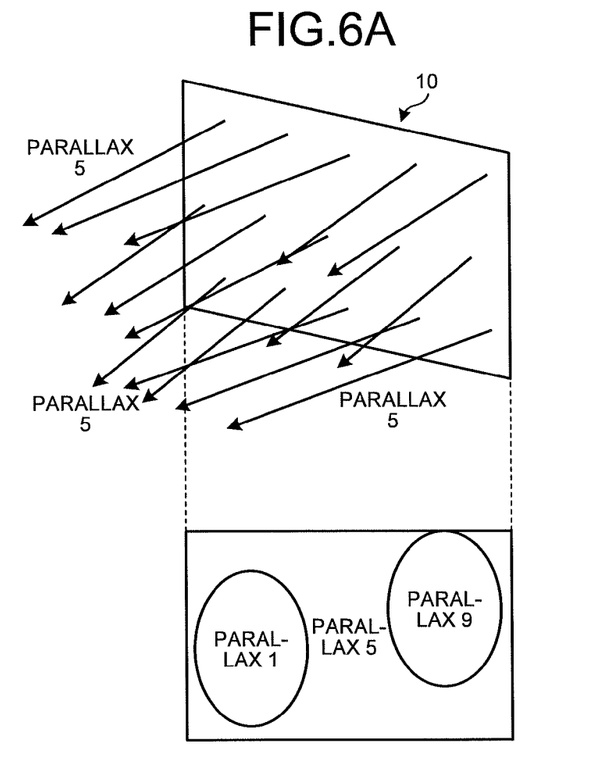
FIGS. 6A and 6B are schematic diagrams in a case where the light beam directions are non-uniform.
Figure 6B:
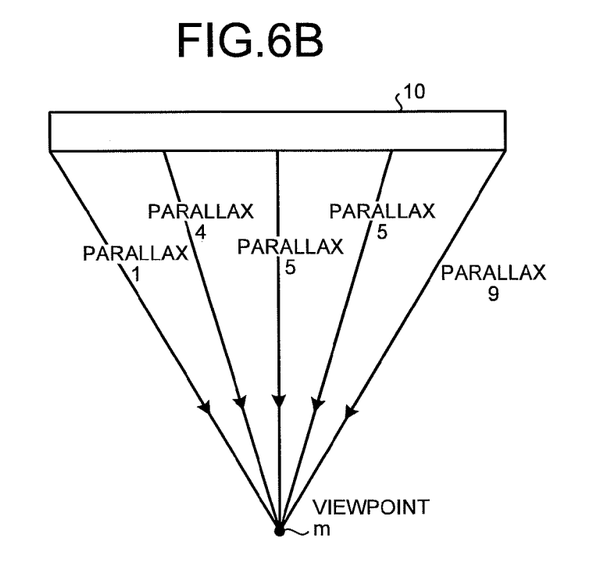

FIGS. 6A and 6B are diagrams illustrating a case where the directions of light beams coming out from pixels with the same parallax number are non-uniform when the number of parallaxes is nine. Non-uniform light beam directions mean that the directions of light beams coming out from pixels with the same parallax number include directions different from the predetermined direction. More specifically, non-uniform light beam directions mean that pixels of parallax images identified by different parallax numbers are viewed at a certain viewpoint position (one eye).

FIG. 6A is a diagram illustrating parallax numbers of parallax images viewed in the display area on the display unit 10 from a certain viewpoint position in a case where the light beam directions are non-uniform. In this example, it is assumed that parallax images to be viewed from the viewpoint position m are those with the parallax number 5. In this case, since light coming out from the pixels of the parallax images with different parallax numbers (1, 4, 5 and 9) enters the viewpoint position m from the display unit 10 as illustrated in FIG. 6B, the viewer will view parallax images with different parallax numbers when the viewer views the display unit 10 from the viewpoint position m with one eye. Thus, when the light beam directions are non-uniform, there will occur regions where a stereoscopic image can be viewed and regions where a stereoscopic image cannot be viewed (pseudoscopic regions) in the display area (screen), and the viewer therefore cannot view a stereoscopic image on the whole screen.

As described above, there may be cases where the directions of light beams coming out from the pixels of the parallax images are different from expected directions owing to distortion of the display unit 10, partial separation of the panel and the lens due to aged deterioration or the like, for example. In such case, parallax images with parallax numbers that are different from those of parallax images to be viewed from a certain viewpoint position are viewed, the resulting entire screen is not a normal viewing zone, and thus a stereoscopic vision cannot be obtained. In other words, there will occur regions where a stereoscopic image can be viewed and regions where a stereoscopic image cannot be viewed in the display area of the display unit 10.

Therefore, in the first embodiment, the image processing unit 20 performs correction to set a parallax number of a parallax image viewed at a certain viewpoint position to a first parallax number of a parallax image to be viewed at the viewpoint position for each pixel of a stereoscopic image by using correction data representing a difference value between the first parallax number and a second parallax number of a parallax image that is actually viewed at the viewpoint position. The image processing unit 20 then displays the corrected stereoscopic image (a plurality of parallax image; parallax image group) on the display unit 10. As a result, the autostereoscopic display device 1 of the first embodiment can make the screen a normal viewing zone. Specific description will be given below.

Before description of the image processing unit 20, the correction data mentioned above will be described. While an example in which the parallax number is nine will be described here, cases of other numbers of parallaxes can also be considered similarly. In the following description, it is assumed that a parallax number "0" is assigned to a first parallax image, a parallax number "1" is assigned to a second parallax image adjacent thereto, a parallax number "2" is assigned to a third parallax image adjacent thereto, a parallax number "3" is assigned to a fourth parallax image adjacent thereto, a parallax number "4" is assigned to a fifth parallax image adjacent thereto, a parallax number "5" is assigned to a sixth parallax image adjacent thereto, a parallax number "6" is assigned to a seventh parallax image adjacent thereto, a parallax number "7" is assigned to an eighth parallax image adjacent thereto, and a parallax number "8" is assigned to a second parallax image adjacent thereto.

Figure 7:
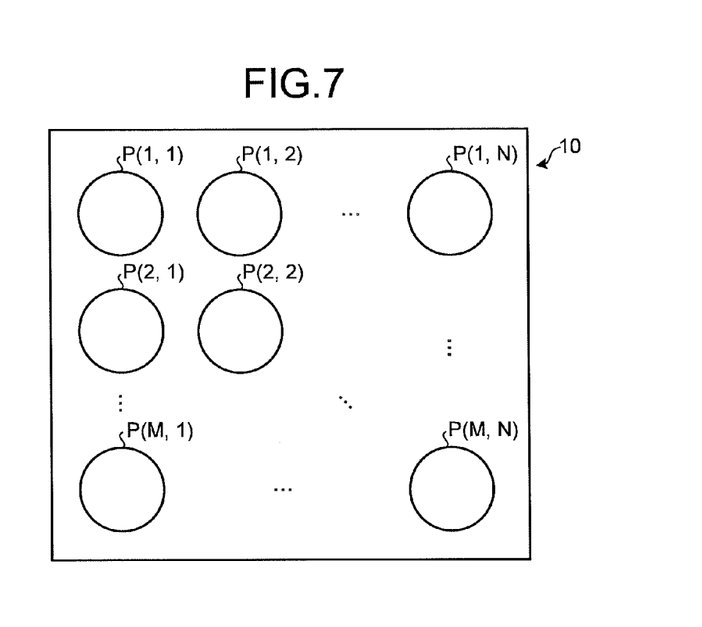
FIG. 7 is a diagram illustrating an example of unit a plurality of unit regions into which a display area is divided.

In addition, the display area of the display unit 10 is divided into a plurality of unit regions P arranged in a matrix of M rows and N columns here as illustrated in FIG. 7. For example, a unit region P on an m-th row (≤M) and an n-th column (≤N) is expressed as P(m, n). Each unit region P is a region in which at least one element image containing pixels with respective parallax numbers 0 to 8 is displayed. In this example, description will be made assuming that one unit region P is a region in which one element image is displayed.

In the first embodiment, correction data representing a difference value between the first parallax number to be viewed at a certain viewpoint position and the second parallax number that is actually viewed at the viewpoint among parallax images with parallax numbers 0 to 8 displayed in a unit region P is obtained for each unit region P, and the obtained corrected data and the unit region P are stored in a storage unit in association with each other. The viewpoint position for calculating the correction data can be set to any position, but an example in which the viewpoint at which a parallax image with the parallax number 4 is to be viewed is set to the viewpoint position for calculating the correction data will be described in this example. In the following, the viewpoint position for calculating the correction data (the viewpoint position at which a parallax image with the parallax number 4 is to be viewpoint in this example) will be referred to as an viewpoint position for correction.

In addition, data representing what parallax number is actually viewed at a certain viewpoint position (the viewpoint position for correction, for example) will be referred to as light beam direction data. Light beam direction data representing a parallax number that is actually viewed at the viewpoint position for correction among the parallax numbers 0 to 8 displayed in a unit region P(m, n) will be expressed as L(m, n). The light beam direction data can also be regarded as corresponding to "a second parallax number" in claim 2. The method for obtaining the light beam direction data may be any method. For example, the light beam direction can be obtained by moving a luminance meter for measuring the luminance of a light beam coming out from the display unit 10, by visually checking parallax images that are sequentially lit up, or by imaging parallax images that are sequentially lit up (a plurality of images may be imaged at a time) and analyzing the imaging results.

While an example of a method of calculating the correction data c(m, n) associated with the unit region P(m, n) is described, a method for calculating the correction data associated with another unit region P can similarly be considered. The correction data associated with the unit region P(m, n) is a difference value between the first parallax number $k_{dst}$ (4 in this example) to be viewed at the viewpoint position for correction and the light beam direction data L(m, n) representing the parallax number that is actually viewed at the viewpoint position for correction among the parallax numbers 0 to 8 displayed in the unit region P(m, n), and can be obtained by the following expression (2).

$$C(m,n)=k_{dst}-L(m,n) \qquad (2)$$

For example, when the parallax number actually viewed at the viewpoint position for correction is 2 among the parallax numbers 0 to 8 displayed in the unit region P(m, n), the correction data c(m, n) will be "2 (=4−2)". In this manner, correction data are obtained for each unit region P, and the obtained correction data and the unit regions P are stored in advance in the storage unit in association with each other. On the above assumption, specific details of the image processing unit 20 according to the first embodiment will be described.

Figure 8:
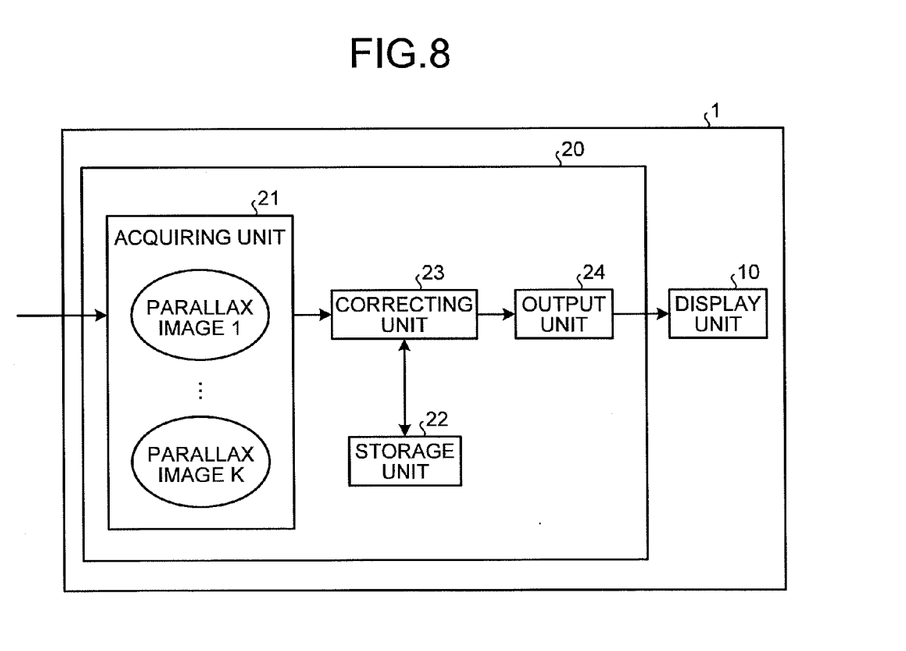
FIG. 8 is a diagram illustrating an exemplary configuration of an image processing unit according to the first embodiment.

FIG. 8 is a block diagram illustrating an exemplary configuration of the image processing unit 20. As illustrated in FIG. 8, the image processing unit 20 includes an acquiring unit 21, a storage unit 22, a correcting unit 23 and an output unit 24. The acquiring unit 21 acquires K (K is an integer of 2 or larger) parallax images used for a stereoscopic image. In other words, the acquiring unit 21 has a function of acquiring a stereoscopic image containing a plurality of parallax images.

The storage unit 22 stores therein the correction data described above. More specifically, the storage unit 22 stores each of a plurality of unit regions P and the correction data in association with each other.

The correcting unit 23 corrects a parallax number of a sub-pixel calculated by pixel mapping described above by using the correction data stored in the storage unit 22 for each sub-pixel of the display panel 11. Specific description will be given below. Herein, the number of sub-pixels in the first direction (row direction) of the display panel 11 is represented by W, the number of sub-pixels in the second direction (column direction) is represented by H, and position coordinates of a sub-pixel of the display panel 11 arranged below the lens are represented by $(i, j)^T$. T represents a transpose.

The relation between the sub-pixel position $(i, j)^T$ and the coordinate position $(m, n)^T$ of the unit region P is expressed by the following expression (3).

$$\begin{bmatrix} m \\ n \end{bmatrix} = \begin{bmatrix} \frac{M}{W}i \\ \frac{N}{H}j \end{bmatrix} \quad (3)$$

Accordingly, the correction data for the unit region P corresponding to the sub-pixel position $(i, j)^T$ are expressed by the following expression (4).

$$\text{correction data for sub-pixel position } (i, j)^T = C\left(\frac{M}{W}i, \frac{N}{H}j\right) \quad (4)$$

Note that the coordinate position for the unit region P corresponding to the sub-pixel position $(i, j)^T$ may be a value that is not an integer. In this case, the correction data for the sub-pixel position $(i, j)^T$ can be obtained by performing interpolation using adjacent correction data, for example.

The correcting unit 23 modifies the parallax number of each sub-pixel according to a value indicated by the correction data for the unit region P corresponding to the sub-pixel. More specifically, the correcting unit 23 modifies the parallax number of each sub-pixel to a parallax number indicated by a remainder resulting from dividing a value obtained by adding a value of the parallax number before correction calculated by the pixel mapping described above and a value of correction data associated with the sub-pixel by the number of parallaxes K. For example, when the parallax number before the correction of a sub-pixel $(i, j)$ on an i-th row and a j-th column is represented by $v(i, j)$, the parallax number $v'(i, j)$ of the sub-pixel $(i, j)$ after the correction by the correcting unit 23 can be expressed by the following expression (5).

$$v'(i, j) = \text{mod}\left(v(i, j) + C\left(\frac{M}{W}i, \frac{N}{H}j\right), K\right) \quad (5)$$

The parallax image to be arranged at the position coordinates $(i, j)^T$ can be expressed by the following expression (6).

$$I'(i,j) = I_{v'(i,j)}(i,j) \quad (6)$$

Note that the parallax number $v'(i, j)$ may not be an integer but a decimal. In such case, the parallax image can be obtained by linear interpolation as in the following expression (7).

$$k_0 = \text{mod}(\lfloor v'(i,j) \rfloor, K)$$

$$k_1 = \text{mod}(\lfloor v'(i,j) \rfloor + 1, K)$$

$$\alpha = v'(i,j) - k_0$$

$$I'=(i,j) = (1-\alpha)I_{k_0}(i,j) + \alpha I_{k_1} \quad (7)$$

where $\lfloor x \rfloor$ represents a maximum integer not larger than x, and $\text{mod}(x, K)$ represents a remainder resulting from dividing x by K.

Figure 9:
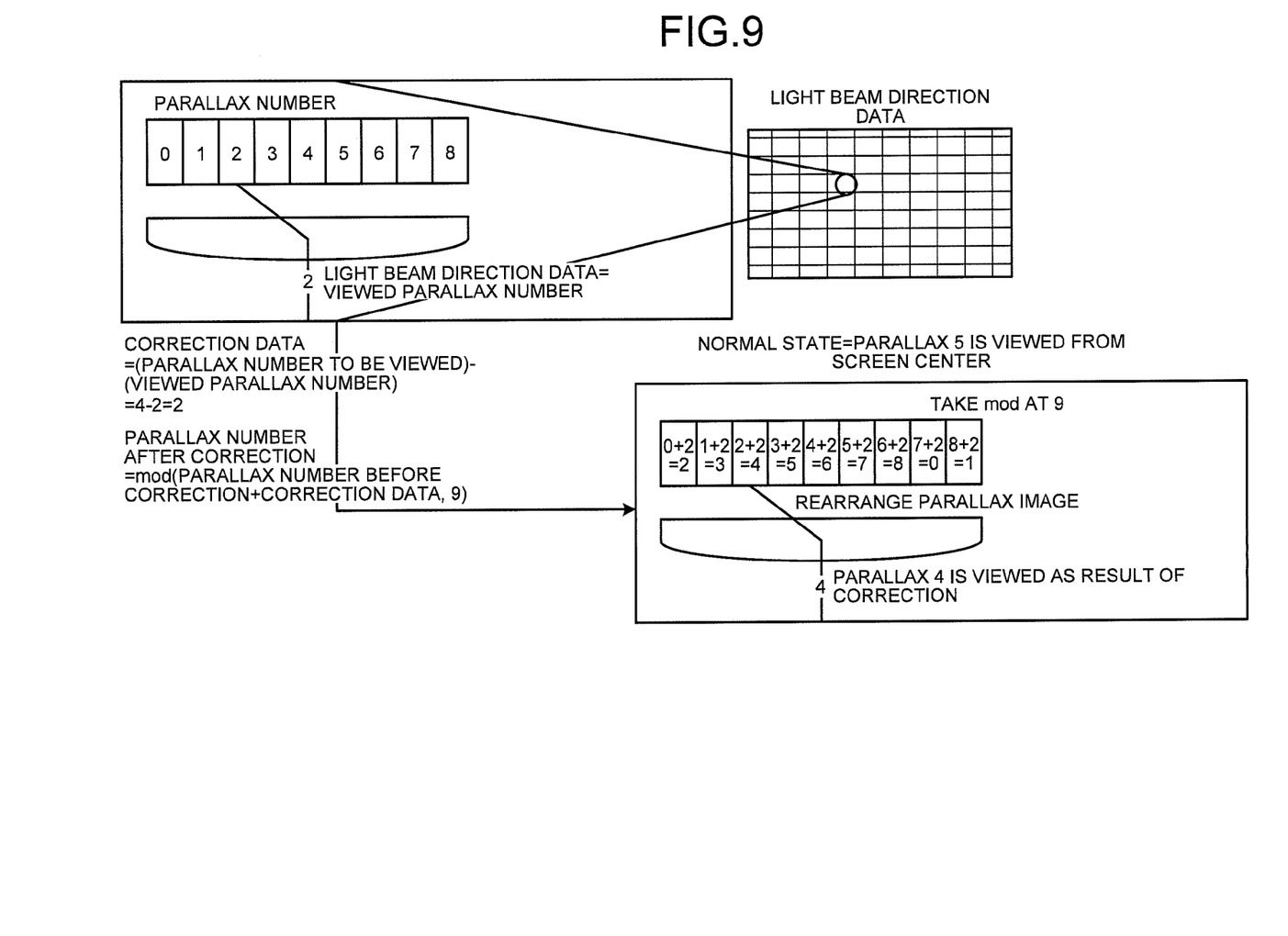
FIG. 9 is a conceptual diagram of a correction process performed by a correcting unit.

FIG. 9 is a conceptual diagram of a correction process performed on each pixel with parallax numbers 0 to 8 corresponding to a certain unit region P. In the example of FIG. 9, the parallax number to be viewed at the viewpoint position for correction is "4" while the parallax number actually viewed at the viewpoint position for correction among the parallax numbers 0 to 8 corresponding to a certain unit region P is "2" (that is, the light beam direction data of the unit region P=2). Accordingly, the correction data corresponding to the unit region P is "2" (=4−2), and each pixel corresponding to the unit region P is modified to a pixel with the parallax number indicated by the remainder resulting from dividing a value obtained by adding "2" to the parallax number before the correction by the parallax number "9" (see FIG. 9). As described above, the correcting unit 23 modifies the arrangement of the sub-pixels so that the parallax image with the parallax number 4 (the parallax image to be viewed at the viewpoint position for correction) will be viewed at the viewpoint position for correction. As a result, the parallax image with the parallax number "4" is viewed at the viewpoint position for correction. The correcting unit 23 output the corrected parallax image group to the output unit 24. The output unit 24 outputs the parallax image group received from the correcting unit 23 (in other words, a stereoscopic image corrected by the correcting unit 23) to the display panel 11 of the display unit 10.

Figure 10:
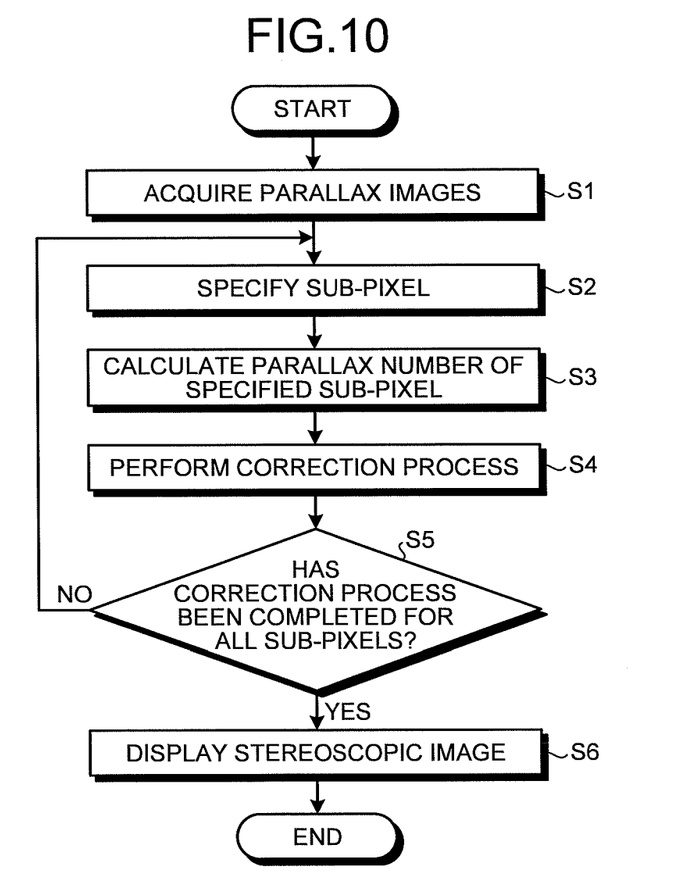
FIG. 10 is a flowchart illustrating an example of a process performed by the image processing unit.

FIG. 10 is a flowchart illustrating an example of a process performed by the image processing unit 20 according to the first embodiment. As illustrated in FIG. 10, the acquiring unit 21 first acquires a plurality of parallax image (step S1). The acquiring unit 21 outputs the acquired parallax image group to the correcting unit 23. The correcting unit 23 specifies any of a plurality of sub-pixels to be arranged in a matrix on the display panel 11 (step S2). The correcting unit 23 calculates the parallax number of the sub-pixel specified in step S2 by the expression (1) described above (step S3). The correcting unit 23 obtains correction data for the unit region P corresponding to the sub-pixel specified in step S2 and performs a correcting process on the sub-pixels (step S4).

If the correction process has been completed on all the sub-pixels (if the result of step S5 is YES), the correcting unit 23 outputs the corrected parallax image group to the output unit 24. The output unit 24 then displays the parallax image group received from the correcting unit 23 on the display panel 11 (step S6) and terminates this routine. If the correction process has not been completed on all the sub-pixels (if the result of step S5 is NO), on the other hand, the process returns to step S2 described above where the correcting unit 23 sequentially specifies a sub-pixel on which the correction process has not been completed.

As described above, according to the first embodiment, since correction to set a parallax number of a parallax image viewed at the viewpoint position for correction to a first parallax number of a parallax image to be viewed at the viewpoint position for correction is performed for each pixel of a stereoscopic image by using correction data representing a difference value between the first parallax number and a second parallax number of a parallax image that is actually viewed at the viewpoint position for correction, it is possible to suppress occurrence of regions where a stereoscopic image can be viewed and regions (pseudoscopic regions) where a stereoscopic image cannot be viewed in a display area (screen) of a stereoscopic image. In other words, according to the first embodiment, it is possible to make a screen a normal viewing zone.

Modified Example of First Embodiment

The obtained light beam direction data, however, are likely to be distorted into a trapezoid or the like instead of a rectangular that is the panel shape owing to distortion of a camera lens or the like. Coordinate transformation for correction of such distortion can be expressed by the following expression (8), for example.

$$\begin{bmatrix} \delta_1(m, n) \\ \delta_2(m, n) \end{bmatrix} = \delta\left(\begin{bmatrix} m \\ n \end{bmatrix}\right) \quad (8)$$

When projective transformation is used, for example, the coordinate transformation can be expressed by the following expression (9).

$$\delta\left(\begin{bmatrix} m \\ n \end{bmatrix}\right) = \begin{bmatrix} \dfrac{a_0 m + a_1 n + a_2}{a_6 m + a_7 n + 1} \\ \dfrac{a_3 m + a_4 n + a_5}{a_8 m + a_9 n + 1} \end{bmatrix} \quad (9)$$

In the expression (9), $a_0$ to $a_9$ represent parameters for projective transformation that can be obtained from coordinates of four corners of the panel in the obtained light beam direction data and four corners of a liquid crystal panel (display panel 11). Accordingly, the correction data for the sub-pixel position $(i, j)^T$ are expressed by the following expression (10).

$$\text{correction data for sub-pixel position}(i, j)^T = \quad (10)$$
$$C\left(\delta_1\left(\dfrac{M}{W}i, \dfrac{N}{H}j\right), \delta_2\left(\dfrac{M}{W}i, \dfrac{N}{H}j\right)\right)$$

Thus, the correction data for a sub-pixel can also be regarded as being expressed by a difference value between a first parallax number to be viewed at the viewpoint position for correction and a second parallax number that is actually viewed at the viewpoint position for correction among a plurality of parallax numbers displayed on the unit region P corresponding to the sub-pixel and on which distortion correction for correcting distortion of the light beam is performed.

Note that the coordinate position for the unit region P corresponding to the sub-pixel position $(i, j)^T$ may be a value that is not an integer. In this case, the correction data for the sub-pixel position $(i, j)^T$ can be obtained by performing interpolation using correction data for adjacent sub-pixel positions, for example.

Similarly to the first embodiment described above, the correcting unit 23 modifies the parallax number of each sub-pixel according to a value indicated by the correction data for the sub-pixel. More specifically, the correcting unit 23 modifies the parallax number of each sub-pixel to a parallax number indicated by a remainder resulting from dividing a value obtained by adding a value of the parallax number before correction calculated by the pixel mapping described above and a value of correction data for the sub-pixel by the number of parallaxes K. For example, when the parallax number before the correction of a sub-pixel (i, j) on an i-th row and a j-th column is represented by v(i, j), the parallax number v'(i, j) of the sub-pixel (i, j) after the correction by the correcting unit 23 can be expressed by the following expression (11).

$$v'(i, j) = \text{mod}\left(v(i, j) + C\left(\delta_1\left(\dfrac{M}{W}i, \dfrac{N}{H}j\right), \delta_2\left(\dfrac{M}{W}i, \dfrac{N}{H}j\right)\right), K\right) \quad (11)$$

Since other details are similar to those in the first embodiment, detailed description thereof will not be repeated.

Second Embodiment

In the first embodiment described above, the aforementioned correction is performed by using the correction data at one viewpoint position (the viewpoint position for correction). In contrast, the second embodiment differs from the first embodiment in that a storage unit storing correction data at each of a plurality of assumed viewpoint positions (referred to as "candidate viewpoint positions") are stored in advance is provided and in that the correction data associated with a position of the viewer are obtained from the position of the viewer and information stored in the storage unit and the aforementioned correction is performed by using the obtained correction data. Specific description will be given below. Components designated by the same reference numerals as in the first embodiment have similar functions and redundant description thereof will not be repeated as appropriate.

Figure 11:
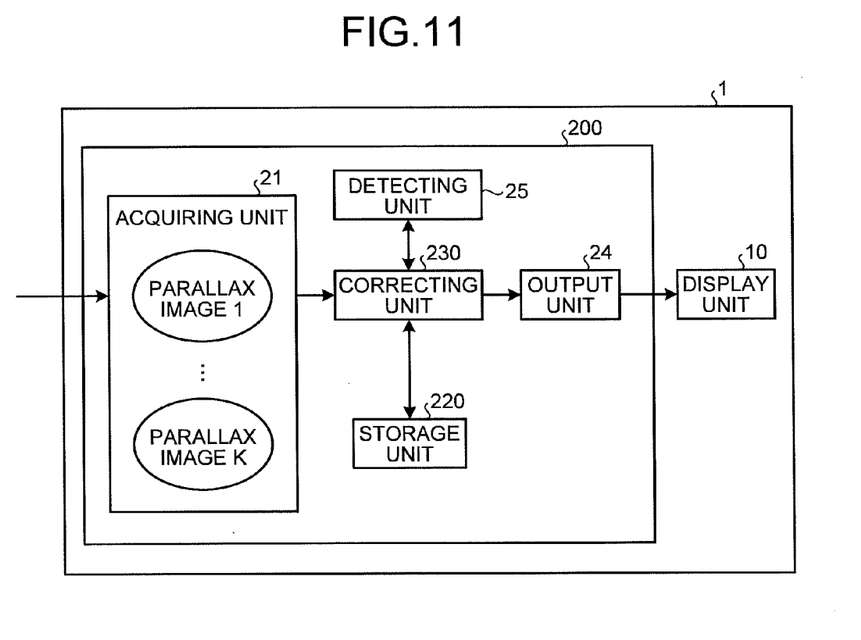
FIG. 11 is a diagram illustrating an exemplary configuration of an image processing unit according to a second embodiment.

FIG. 11 is a diagram illustrating an exemplary configuration of an image processing unit 200 according to the second embodiment. As illustrated in FIG. 11, the image processing unit 200 includes an acquiring unit 21, a storage unit 220, a detecting unit 25, a correcting unit 230 and an output unit 24. The storage unit 220 stores therein candidate position information representing candidate viewpoint positions and correction data for each unit region P in association with each other for a plurality of candidate viewpoint positions. The correction data for each unit regions P at each candidate viewpoint position are calculated in advance and stored in the storage unit 220 similarly to the first embodiment. The number of candidate viewpoint positions can be set to any value according to design conditions or the like.

The detecting unit 25 detects the position of the viewer. More specifically, the detecting unit 25 acquires a picture from a camera and detects a region of faces of one or more viewers by means of a known face detection method. The detecting unit 25 then sets positions of any of a right eye, a left eye and both eyes and determines spatial X and Y coordinates of the viewer. For example, a position where an eye exists with highest probability in a face region may be set as the position of an eye of the viewer. Alternatively, the positions of a right eye, a left eye and both eyes can also be detected by means of a known eye detection method from an image captured by a camera. Alternatively, it is also possible to estimate a distance to the viewer by using the size of a face on an image captured by a camera and determine a spatial Z coordinate of the viewer. The detecting unit 25 detects one or more of these X, Y and Z coordinates as viewer position information representing the position of the viewer and outputs the detected viewer position information to the correcting unit 230.

When the viewer position information detected by the detecting unit 25 is coincident with any of a plurality of pieces of candidate viewpoint position information stored in the storage unit 220, the correcting unit 230 performs the aforementioned correction by using the correction data associated with the candidate viewpoint position information that is coincident with the viewer position information detected by the detecting unit 25.

Figure 12:
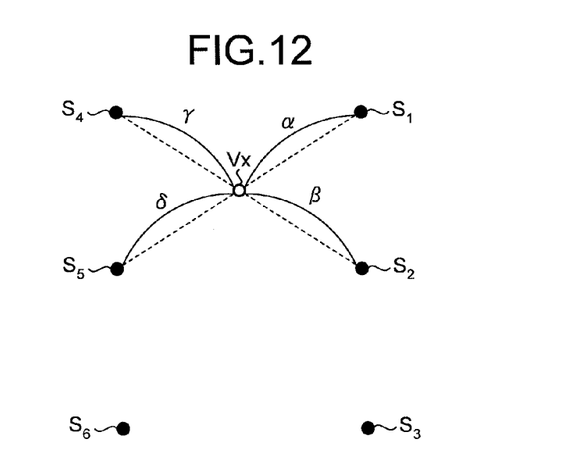
FIG. 12 is a diagram for explaining an example of calculation of correction data according to a position of a viewer.

When the viewer position information detected by the detecting unit 25 is not coincident with any of the pieces of candidate viewpoint position information, on the other hand, the correcting unit 230 performs interpolation to obtain correction data associated with the viewer position information. As illustrated in FIG. 12, for example, when there are six pieces of candidate viewpoint positions S, i.e., $S_1$, $S_2$, $S_3$, $S_4$, $S_5$, and $S_6$, set in advance and the position Vx of the viewer represented by the viewer position information detected by the detecting unit 25 is not coincident with any of the candidate viewpoint positions S, the correcting unit 230 determines a candidate viewpoint position S with a distance to the positions Vx of the viewer being a threshold or shorter. In the example of FIG. 12, the candidate point positions $S_1$, $S_2$, $S_4$ and $S_5$ are determined. The correcting unit 230 then obtains the correction data associated with the position Vx of the viewer by performing linear interpolation according to a distance α between the candidate viewpoint position $S_1$ and the position Vx of the viewer, a distance β between the candidate viewpoint position $S_2$ and the position Vx of the viewer, a distance γ between the candidate viewpoint position $S_4$ and the position Vx of the viewer, and a distance δ between the candidate viewpoint position $S_5$ and the position Vx of the viewer. The correcting unit 230 then performs the aforementioned correction by using the obtained correction data.

In the embodiments described above, the light beam control element 12 is arranged in such a way that the extending direction of the optical openings has a predetermined tilt with respect to the second direction (column direction) of the display panel 11, and an angle or the tilt can be arbitrarily changed. Alternatively, the light beam control element 12 may have a structure (a so-called vertical lens) in which the extending direction of the optical openings thereof is coincident with the second direction of the display panel 11, for example.

In the first embodiment described above, for example, the storage unit 22 may be configured to store the light beam direction data for each unit region P and the parallax number to be viewed at the viewpoint position for correction instead of the correction data. In other words, the correcting unit 23 can obtain the light beam direction data associated with a sub-pixel to be corrected and the parallax number to be viewed at the viewpoint position for correction from the information stored in the storage unit 22, then calculate the correction data that are a difference value between the light beam direction data and the parallax number, and perform the aforementioned correction by using the calculated correction data. In other words, the correcting unit 23 may be configured to generate the correction data. The light beam direction data for each unit region P and the parallax number to be viewed at the viewpoint position for correction may be stored in separate storage units.

Similarly, in the second embodiment described above, the storage unit 220 may be configured to store the light beam direction data for each candidate viewpoint position and the parallax number to be viewed at each candidate viewpoint position instead of storing the correction data for each candidate viewpoint position (that is, the correcting unit 230 may be configured to generate correction data for each candidate viewpoint position).

The image processing unit (20, 200) in the embodiments described above is a hardware configuration including a CPU (central processing unit), a ROM, a RAM, a communication I/F unit, etc. The functions of respective components described above are implemented by expanding and executing various programs stored in the ROM on the RAM. Alternatively, at least part of the functions of the components can be implemented by an individual circuit (hardware).

Alternatively, the programs to be executed by the image processing unit (20, 200) according to the embodiments described above may be stored on a computer system connected to a network such as the Internet, and provided by being downloaded via the network. Alternatively, the programs to be executed by the image processing unit (20, 200) according to the embodiments described above may be provided or distributed through a network such as the Internet. Still alternatively, the programs to be executed by the image processing unit (20, 200) in the embodiments described above may be embedded on a ROM or the like in advance and provided therefrom.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
an acquiring unit configured to acquire a stereoscopic image containing a plurality of parallax images each having a mutually different parallax; and
a correcting unit configured to perform, for each pixel of the stereoscopic image, correction to set a parallax number of a parallax image viewed at a viewpoint position to a first parallax number of a parallax image to be viewed at the viewpoint position by using correction data representing a difference value between the first parallax number and a second parallax number of a parallax image that is actually viewed at the viewpoint position and on which distortion correction for correcting distortion of light beams has been performed, wherein
the correcting unit modifies, for each pixel of the stereoscopic image, the parallax number of the pixel to a parallax number indicated by a remainder value resulting from dividing a value obtained by adding a value of the parallax number before correction and a value of the correction data for the pixel by the number of parallaxes.

2. The device according to claim 1, wherein
a display area of a display unit capable of displaying the stereoscopic image is divided in advance into a plurality of unit regions, each of the unit regions being a region in which an element image containing pixels of the parallax images is displayed, and
the correcting unit modifies the parallax number of each pixel of the stereoscopic image according to a value indicated by the correction data for the unit region corresponding to the pixel.

3. The device according to claim 1, further comprising:
a storage unit that stores therein each of a plurality of viewpoint positions in association with the correction data; and
a detecting unit that detects a position of a viewer, wherein
the correcting unit obtains the correction data associated with the position of the viewer detected by the detecting unit from the position of the viewer and information stored in the storage unit, and performs the correction by using the obtained correction data.

4. An autostereoscopic display device, comprising:
an acquiring unit configured to acquire a stereoscopic image containing a plurality of parallax images each having a mutually different parallax;
a correcting unit configured to perform correction to set a parallax number of a parallax image viewed at a viewpoint position to a first parallax number of a parallax image to be viewed at the viewpoint position for each pixel of the stereoscopic image by using correction data representing a difference value between the first parallax number and a second parallax number of a parallax image that is actually viewed at the viewpoint position and on which distortion correction for correcting distortion of light beams has been performed; and
a display unit that displays the stereoscopic image on which the correction by the correcting unit is performed, wherein
the correcting unit modifies, for each pixel of the stereoscopic image, the parallax number of the pixel to a parallax number indicated by a remainder value resulting from dividing a value obtained by adding a value of the parallax number before correction and a value of the correction data for the pixel by the number of parallaxes.

5. An image processing method, comprising:
acquiring a stereoscopic image containing a plurality of parallax images each having a mutually different parallax; and
performing, for each pixel of the stereoscopic image, correction to set a parallax number of a parallax image viewed at a viewpoint position to a first parallax number of a parallax image to be viewed at the viewpoint position by using correction data representing a difference value between the first parallax number and a second parallax number of a parallax image that is actually viewed at the viewpoint position and on which distortion correction for correcting distortion of light beams has been performed, wherein
the correction includes modifying, for each pixel of the stereoscopic image, the parallax number of the pixel to a parallax number indicated by a remainder value resulting from dividing a value obtained by adding a value of the parallax number before correction and a value of the correction data for the pixel by the number of parallaxes.

* * * * *